United States Patent
Cesari et al.

(10) Patent No.: US 11,052,495 B2
(45) Date of Patent: Jul. 6, 2021

(54) BLOCK POSITIONING TOOL

(71) Applicant: Caterpillar Paving Products Inc., Brooklyn Park, MN (US)

(72) Inventors: Marco Cesari, Budrio (IT); Danilo Ciardullo, Minerbio (IT); Valerio E. D'Ascanio, Granarolo dell'Emilia (IT); Dario Sansone, Castello d'Argile (IT); Prasad S. Virgi, Chennai (IN)

(73) Assignee: Caterpillar Paving Products Inc., Brooklyn Park, MN (US)

(*) Notice: Subject to any disclaimer, the term of this patent is extended or adjusted under 35 U.S.C. 154(b) by 522 days.

(21) Appl. No.: 16/101,605

(22) Filed: Aug. 13, 2018

(65) Prior Publication Data
US 2020/0047294 A1  Feb. 13, 2020

(51) Int. Cl.
| | |
|---|---|
| *B23K 37/04* | (2006.01) |
| *E21C 35/18* | (2006.01) |
| *E21C 25/10* | (2006.01) |
| *B28D 1/18* | (2006.01) |

(52) U.S. Cl.
CPC .......... *B23K 37/0443* (2013.01); *B28D 1/186* (2013.01); *E21C 25/10* (2013.01); *E21C 35/18* (2013.01)

(58) Field of Classification Search
CPC . G01B 5/14; B23Q 17/22; B23Q 3/18; B23Q 3/183; B23Q 3/186; B25B 11/00; B25B 11/02

USPC .................................. 33/613, 628, 643, 645
See application file for complete search history.

(56) References Cited

U.S. PATENT DOCUMENTS

| | | | |
|---|---|---|---|
| 4,697,850 A | 10/1987 | Tuneblom | |
| 5,016,943 A | 5/1991 | Wirtgen | |
| 5,987,767 A * | 11/1999 | Roddie | B23K 37/0443 33/628 |

FOREIGN PATENT DOCUMENTS

CN          106321096          1/2017

* cited by examiner

*Primary Examiner* — Tyrone V Hall, Jr.
*Assistant Examiner* — Abbie E Quann

(57) ABSTRACT

A tool for positioning a block on a milling drum having a plurality of welded blocks thereon is provided. The tool includes a longitudinal body. The tool also includes a plurality of arm members extending from the longitudinal body. Each of the plurality of arm members includes a fixture body provided at a distal end thereof. The tool further includes a plurality of fixture assemblies coupled to the fixture body of the corresponding arm member. The plurality of fixture assemblies are adapted to be coupled with corresponding welded blocks of the plurality of welded blocks. Further, at least one of the plurality of arm members and the corresponding fixture assembly coupled to the at least one of the plurality of arm members are adapted to position the block at a desired position on the milling drum relative to the plurality of welded blocks.

20 Claims, 8 Drawing Sheets

US 11,052,495 B2

BLOCK POSITIONING TOOL

TECHNICAL FIELD

The present disclosure relates to a block positioning tool. More particularly, the present disclosure relates to the tool and a method for positioning a block on a milling drum.

BACKGROUND

Machines, such as cold planers, rotary mixers, and other such milling machines, are used for scarifying, removing, mixing, or reclaiming material from surfaces, such as, grounds, roadbeds, and the like. Such machines include a milling drum. The milling drum includes a cylindrical shell member and a number of cutting assemblies mounted on the shell member. When the machine is performing a cutting operation, cutting bits of the cutting assemblies impact the surface and break it apart. Thus, the cutting assemblies are arranged to cut the surface and to leave a milled surface that meets a known texture requirement. Another function of the cutting assemblies is to form an auger that moves material to a location from where it can be moved by a conveyor to a truck.

Cutting bits of the cutting assemblies are typically arranged on the milling drum in a spiral configuration. Each cutting assembly includes a block that is used to receive and securely hold a corresponding cutting bit during machine operation. The blocks are subjected to severe impact forces and are usually welded to the milling drum. Further, one or more blocks of the milling drum may require periodic replacement as the blocks are susceptible to friction and wear and may be damaged during machine operation. Replacing a damaged block generally requires special fixtures and may be time consuming, making it difficult for end users to replace such broken blocks on a worksite.

U.S. Pat. No. 5,987,767 describes a cutting block alignment mechanism including a mounting assembly adapted to releasably couple to a cutting block of a cutting drum. A bracket is provided for releasably engaging a cutting tool of the cutting block. The bracket is adapted to be selectively lowered and moved laterally with respect to the mounting assembly.

SUMMARY OF THE DISCLOSURE

In one aspect of the present disclosure, a tool for positioning a block on a milling drum having a plurality of welded blocks thereon is provided. The tool includes a longitudinal body. The tool also includes a plurality of arm members extending from the longitudinal body. Each of the plurality of arm members includes a fixture body provided at a distal end thereof. The tool further includes a plurality of fixture assemblies coupled to the fixture body of the corresponding arm member. The plurality of fixture assemblies are adapted to be coupled with corresponding welded blocks of the plurality of welded blocks. Further, at least one of the plurality of arm members and the corresponding fixture assembly coupled to the at least one of the plurality of arm members are adapted to position the block at a desired position on the milling drum relative to the plurality of welded blocks.

In another aspect of the present disclosure, a method of positioning a block on a milling drum using a tool is provided. The milling drum includes a first welded block and a second welded block mounted thereon. Further, the tool includes a longitudinal body, a first arm member, a second arm member, and a positioning arm member. The method includes coupling a first fixture assembly to a first fixture body associated with the first arm member. The method also includes coupling a second fixture assembly to a second fixture body associated with the second arm member. The method further includes coupling the first fixture assembly with the first welded block and the second fixture assembly with the second welded block by aligning the first fixture assembly and the second fixture assembly with the first welded block and the second welded block, respectively. The method includes coupling a positioning fixture assembly to a positioning fixture body associated with the positioning arm member. The method also includes coupling the positioning fixture assembly with the block to be positioned on the milling drum by aligning the positioning fixture assembly with the block. The coupling of the positioning fixture assembly with the block allows positioning of the block at a desired position on the milling drum relative to the first welded block and the second welded block.

In yet another aspect of the present disclosure, a tool for positioning a block on a milling drum having a first welded block and a second welded block thereon is provided. The tool includes a longitudinal body. The tool also includes a handle coupled to the longitudinal body. The tool includes a first arm member extending from the longitudinal body. The first arm member includes a first fixture body provided at a distal end thereof. The tool further includes a first fixture assembly adapted to be coupled with the first fixture body of the first arm member. The first fixture assembly is further adapted to be coupled with the first welded block. The tool includes a second arm member extending from the longitudinal body, wherein the second arm member includes a second fixture body provided at a distal end thereof. Further, the tool also includes a second fixture assembly adapted to be coupled with the second fixture body of the second arm member. The second fixture assembly is further adapted to be coupled with the second welded block. The tool further includes a positioning arm member extending from the longitudinal body. The positioning arm member includes a positioning fixture body provided at a distal end thereof. The tool includes a positioning fixture assembly adapted to be coupled with the positioning fixture body of the positioning arm member. The positioning fixture assembly is further adapted to be coupled with the block to be positioned on the milling drum for positioning the block at a desired position on the milling drum relative to the first welded block and the second welded block.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
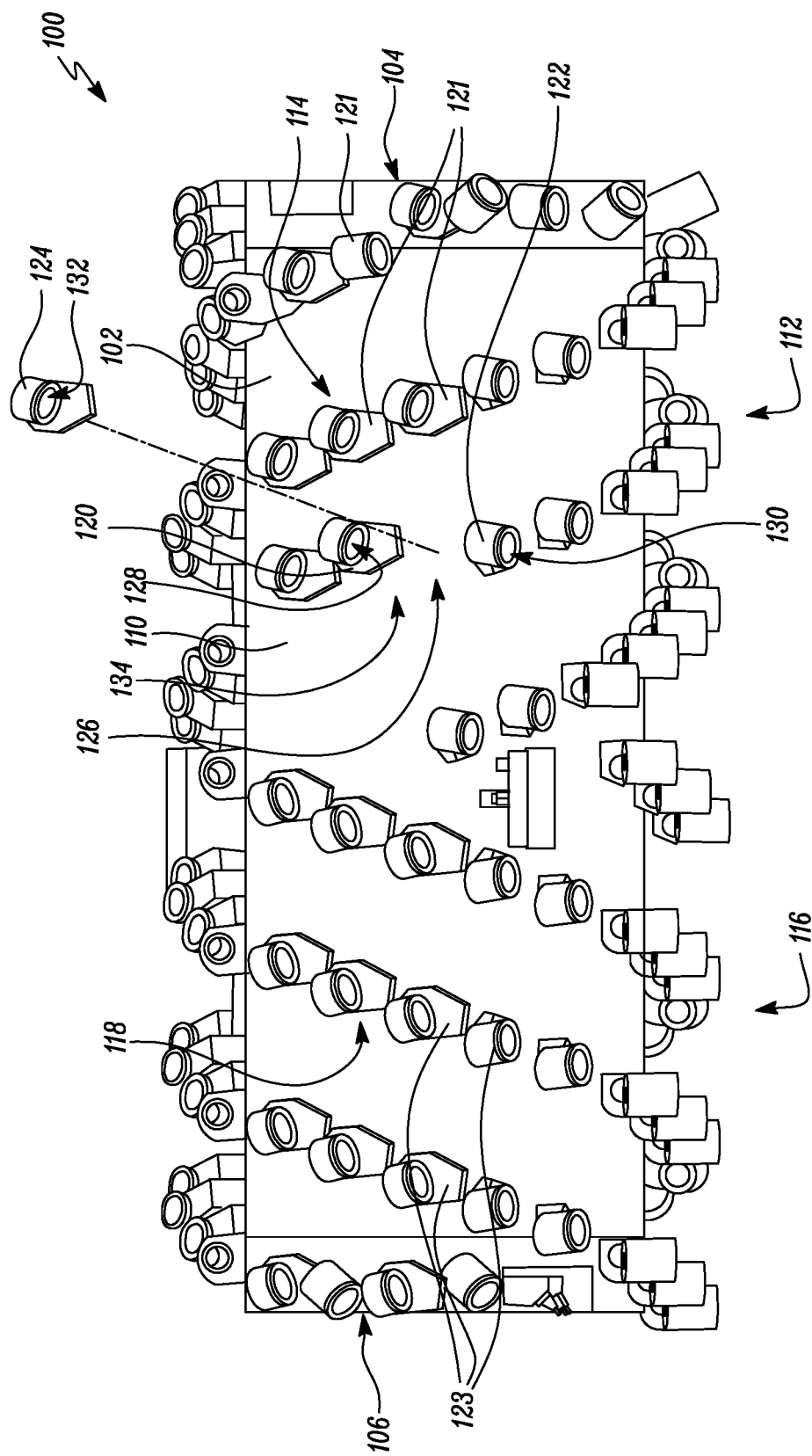
FIG. 1 is a front view of an exemplary milling drum.

FIG. 1 is a front view of an exemplary milling drum 100. The milling drum 100 may be associated with a machine (not shown), such as a cold planer, a rotary mixer, or another milling machine, that removes materials from a ground surface, a pavement, or a roadbed. The milling drum 100 is coupled to a frame (not shown) of the machine and is generally embodied as a height adjustable milling drum that can be raised or lowered, based on application requirements.

The milling drum 100 includes a generally cylindrical shell member 102 having a first edge 104 and a second edge 106. Further, the milling drum 100 includes a number of blocks 121, 123 disposed on an outer surface 110 thereof. The blocks 121, 123 are welded to the milling drum 100. Each of the blocks 121, 123 form a part of a respective cutting assembly. Further, each cutting assembly includes a tool holder (not shown) and a cutting bit (not shown). In an assembled condition of the milling drum 100, each of the blocks 121, 123 receives the corresponding tool holder and the cutting bit. The cutting bits contact the ground surface for removing material therefrom. According to a need of the application, the milling drum 100 can be lowered so that the milling drum 100 contacts and cuts the ground surface through force applied by the cutting assemblies on the ground surface.

In the illustrated embodiment, the blocks 121, 123 are spirally arranged on the shell member 102. More particularly, the blocks 121 at a first side 112 of the milling drum 100 form a right hand spiral block arrangement 114 starting from the first edge 104 of the milling drum 100. Whereas, the blocks 123 at a second side 116 of the milling drum 100 form a left hand spiral block arrangement 118 starting from the second edge 106 of the milling drum 100. This arrangement of the blocks 121, 123, and more particularly the cutting assemblies, allows movement of removed material to a central portion of the milling drum 100 from where the removed material may be moved by a conveyor (not shown) to another machine (not shown), such as a truck.

Further, the blocks 121, 123 are subjected to wear during machine operation and may have to be periodically replaced. In some situations, one or more blocks 121, 123 may break down on a worksite and may require immediate replacement. Replacement of one of the blocks 121, 123 involves positioning of a replacement block 124 on the shell member 102 and performing a welding operation to couple the replacement block 124 with the shell member 102. Thus, the replacement block 124 needs to be positioned and held at a desired position 126 such that the replacement block 124 does not fall off during the welding operation. Accordingly, the present disclosure relates to a tool 200 (shown in FIG. 2) that allows positioning of the replacement block 124.

For explanatory purposes, the tool 200 for positioning the block 124 on the right hand spiral block arrangement 114 will be explained in detail below. However, the description provided below is equally applicable to a tool 600 shown in FIG. 6 that allows positioning of the block 124 on the left hand spiral block arrangement 118, without limiting the scope of the present disclosure.

The tool 200 is used to position the replacement block 124 on the right hand spiral block arrangement 114. The replacement block 124 will be hereinafter interchangeably referred to as the block 124. The tool 200 is used to position the block 124 at the desired position 126 on the milling drum 100. The desired position 126 illustrated herein lies between a first welded block 120 and a second welded block 122. The first and second welded blocks 120, 122 are a part of the right hand spiral block arrangement 114. It should be noted that the tool 200 described herein positions the block 124 at the desired position 126 relative to the first welded block 120 and the second welded block 122. More particularly, the tool 200 positions the block 124 on the milling drum 100 using a position of the first and second welded blocks 120, 122 that are disposed adjacent to the desired position 126. As the first and second welded blocks 120, 122 as well as the desired position 126 is located along a spiral 134 of the right hand spiral arrangement 114, the tool 200 extends along the spiral 134 during positioning of the block 124.

Although, the desired position 126 is illustrated between the first and second welded blocks 120, 122, it should be noted that the desired position 126 may vary based on application requirements. For example, both the first and second welded blocks 120, 122 may be disposed at a left side of the desired position 126 or both the first and second welded blocks 120, 122 may be disposed at a right side of the desired position 126.

Figure 2:
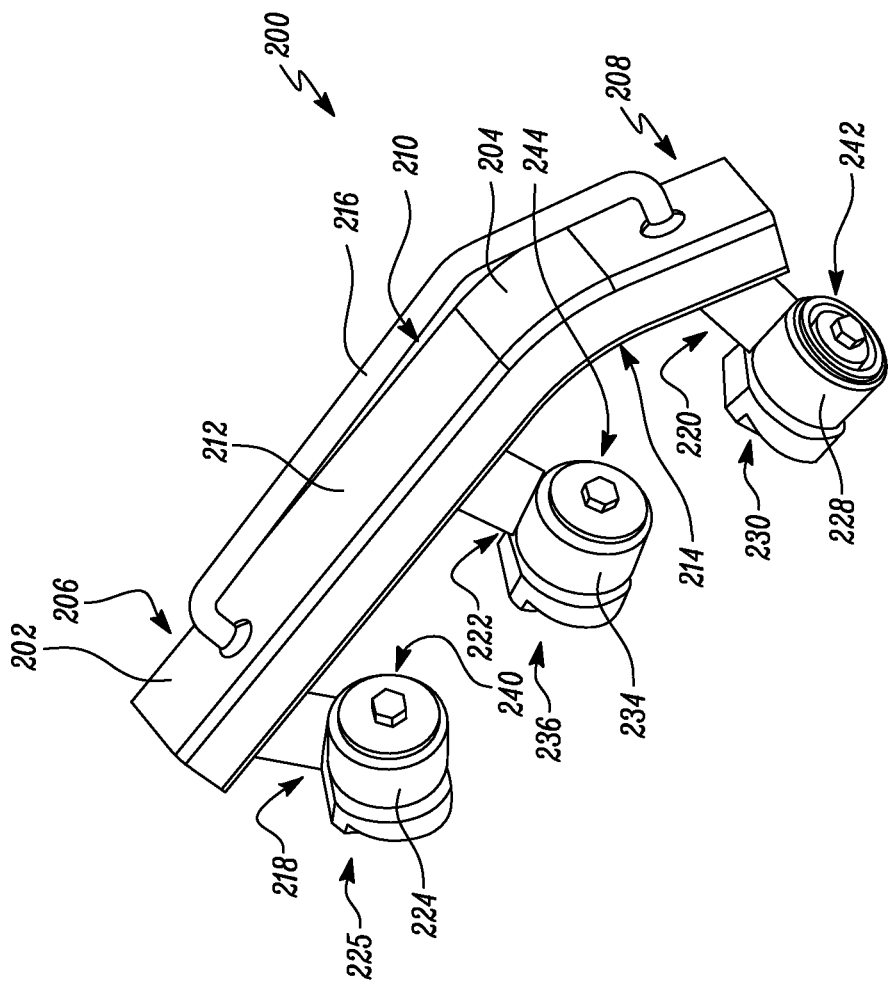
FIG. 2 is a perspective view of a tool for positioning a block on a right hand spiral block arrangement of the milling drum of FIG. 1, according to one embodiment of the present disclosure.

Referring now to FIG. 2, the tool 200 includes a longitudinal body 202. In the illustrated example, the longitudinal body 202 has a rectangular cross-section. Alternatively, the longitudinal body 202 may include any other cross-section, such as a circular cross-section or a square cross-section, without any limitations. Further, the longitudinal body 202 includes a bend 204. The longitudinal body 202 defines a first portion 206, a second portion 208, and an intermediate portion 210. Further, the longitudinal body 202 defines a first surface 212 and a second surface 214 that is provided opposite to the first surface 212. A handle 216 of the tool 200 is coupled to the first surface 212 of the longitudinal body 202 and extends therefrom. The handle 216 allows a maintenance personnel to grip and position the tool 200 relative to the milling drum 100. Further, the handle 216 may be held by the maintenance personnel during the welding operation of the block 124 so that the block 124 maintains contact with the milling drum 100 and does not fall off during the welding operation.

The tool 200 includes a number of arm members 218, 220, 222 extending from the longitudinal body 202. More particularly, the tool 200 includes a first arm member 218, a second arm member 220, and a third arm member 222. In the illustrated example, the third arm member 222 is embodied as a positioning arm member and will be hereinafter interchangeably referred to as the positioning arm member 222. In other embodiments, any one of the first arm member 218 and the second arm member 220 may be embodied as the positioning arm member, without any limitations. In the illustrated example, each of the first, second, and positioning arm members 218, 220, 222 extends from the second surface 214 of the longitudinal body 202, without limiting the scope of the present disclosure. The first arm member 218 is coupled to the first portion 206 of the longitudinal body 202.

Whereas, the second member is coupled to the second portion 208 of the longitudinal body 202. Further, the positioning arm member 222 is coupled to the intermediate portion 210 of the longitudinal body 202.

The first arm member 218 defines a first fixture body 224 provided at a distal end 225 of the first arm member 218. The first fixture body 224 defines a first through-opening 226 (shown in FIG. 3). Further, the second arm member 220 defines a second fixture body 228 provided at a distal end 230 of the second arm member 220. The second fixture body 228 defines a second through-opening 232 (shown in FIG. 3). Additionally, the positioning arm member 222 defines a positioning fixture body 234 provided at a distal end 236 of the positioning arm member 222. The positioning fixture body 234 defines a third through-opening 238 (shown in FIG. 3). It should be noted that in some embodiments the tool 200 may include more than three arm members, based on application requirements.

Figure 3:
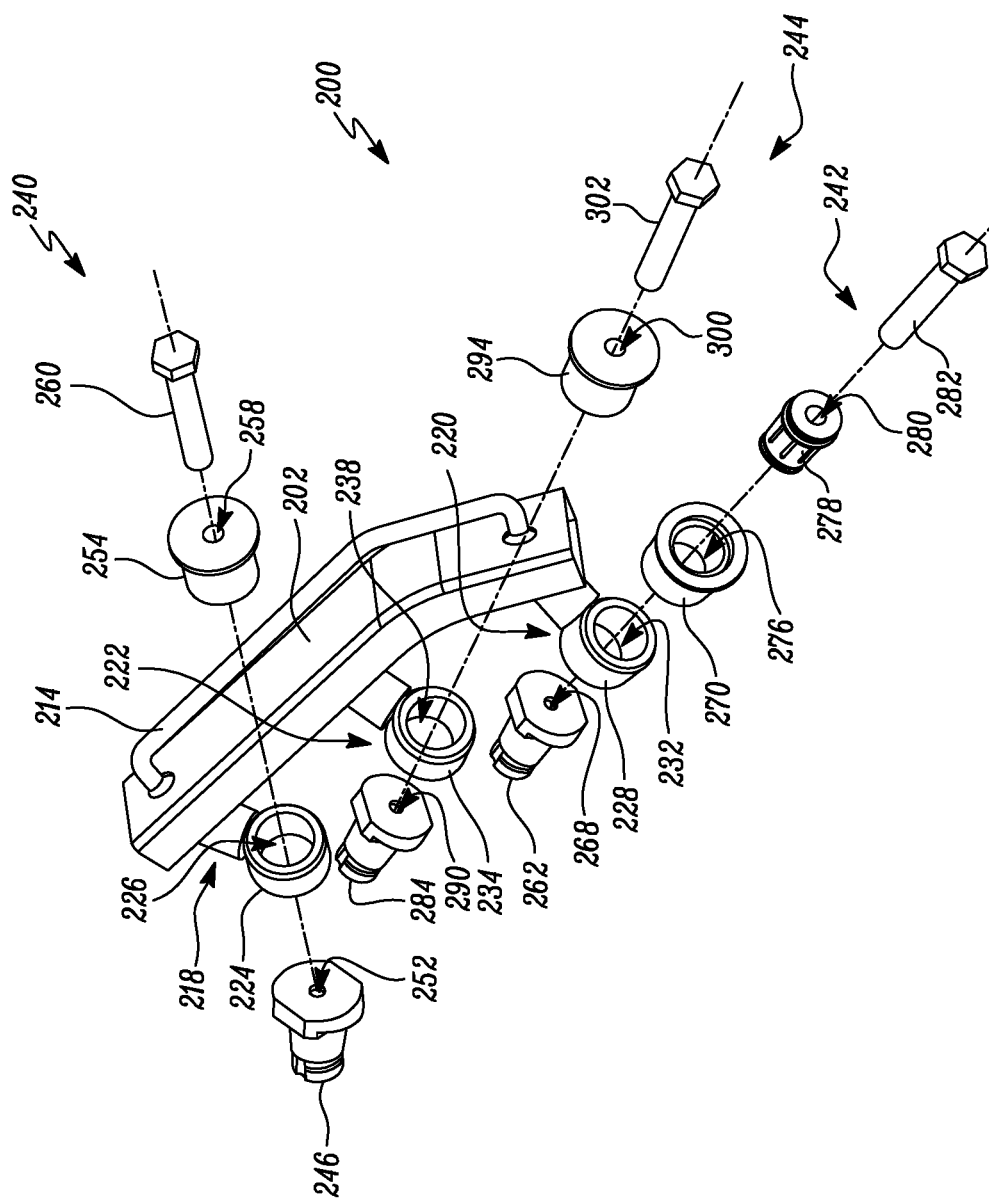
FIG. 3 is an exploded view of the tool shown in FIG. 2.

The tool 200 also includes a number of fixture assemblies 240, 242, 244. More particularly, the tool 200 includes a first fixture assembly 240, a second fixture assembly 242, and a positioning fixture assembly 244. For positioning the block 124 at the desired position 126, the first and second fixture assemblies 240, 242 are coupled with the respective first and second welded blocks 120, 122 (shown in FIGS. 1 and 4). In one example, the first fixture assembly 240 is coupled with the first fixture body 224 before the second fixture assembly 242 is coupled with the second fixture body 228. Referring to FIG. 3, a first pin 246 of the first fixture assembly 240 is received within an opening 128 (shown in FIG. 1) of the first welded block 120 (shown in FIGS. 1 and 4). In an example, the first pin 246 is coupled with the first welded block 120 by an interference fit. The first pin 246 may be coupled to the first welded block 120 using a hammer. When the first pin 246 is coupled with the first welded block 120, a flange portion of the first pin 246 rests on an outer surface of the first welded block 120. The first pin 246 defines a first blind aperture 252.

After coupling the first pin 246 with the first welded block 120, the first fixture assembly 240 is coupled to the first fixture body 224. More particularly, the first fixture assembly 240 includes a first type of bushing 254. The first type of bushing 254 is received within the first through-opening 226 of the first fixture body 224. Further, the first type of bushing 254 defines a first through aperture 258. The first type of bushing 254 and the first pin 246 may be made of the same material or different materials. In one example, the first type of bushing 254 and the first pin 246 may be made of an elastic material, without any limitations.

Figure 4:
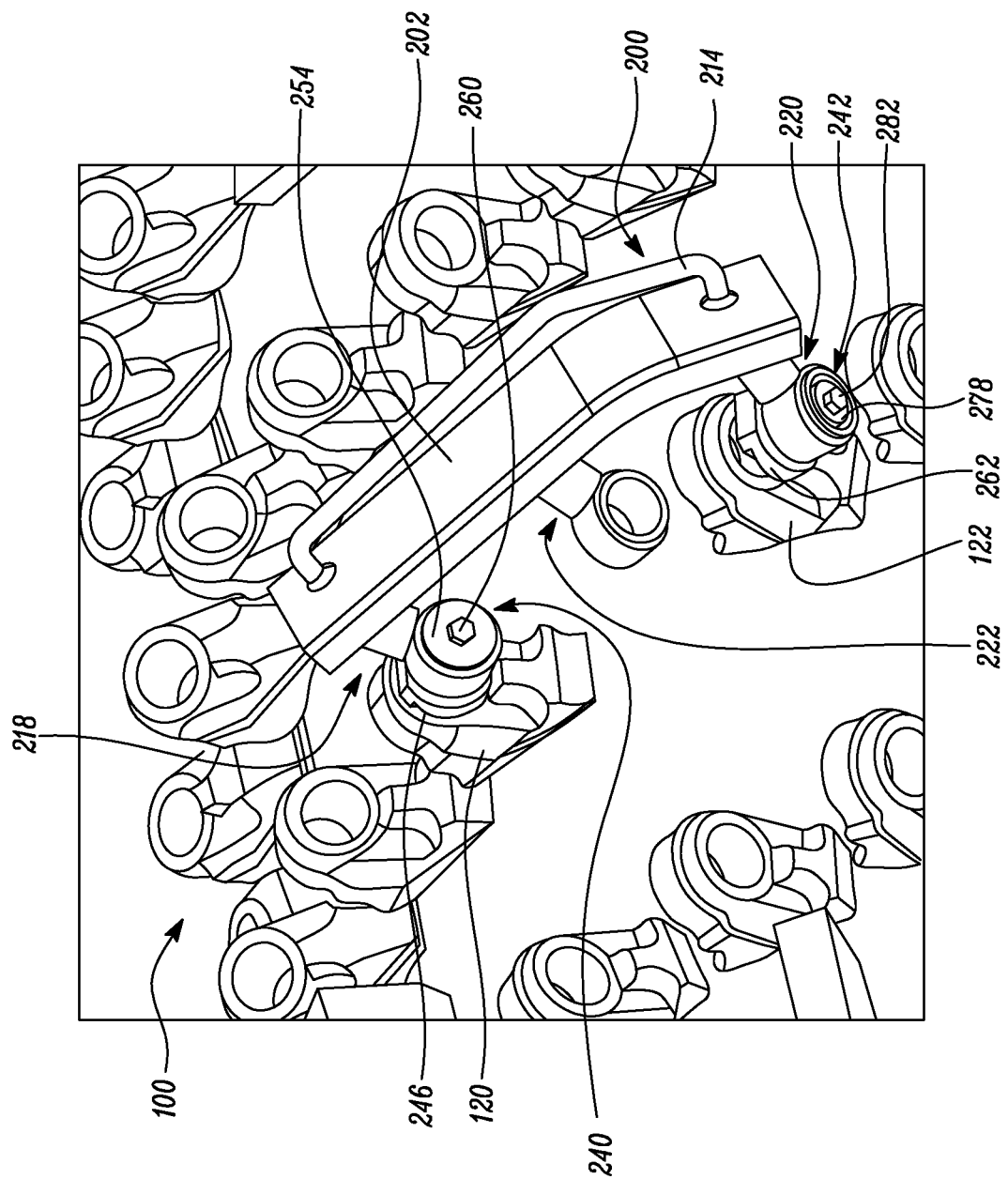
FIG. 4 is a perspective view of the tool and a portion of the milling drum illustrating a first fixture assembly of the tool coupled with a first welded block and a second fixture assembly of the tool coupled with a second welded block.

A mechanical fastener 260 of the first fixture assembly 240 is received within the first through aperture 258 of the first type of bushing 254. In an example, the mechanical fastener 260 is embodied as a bolt. Further, the first blind aperture 252 of the first pin 246 receives a lower portion of the mechanical fastener 260 to couple the first fixture assembly 240 with the first welded block 120. In an example, the mechanical fastener 260 may be threadably coupled to the first type of bushing 254 and the first pin 246. Alternatively, the mechanical fastener 260 may be coupled to the first type of bushing 254 and the first pin 246 by an interference fit, without any limitations. As shown in FIG. 4, the mechanical fastener 260 is aligned and coupled with each of the first type of bushing 254 and the first pin 246 to couple the first fixture assembly 240 with the first welded block 120.

After coupling of the first fixture assembly 240 with the first fixture body 224, the second fixture assembly 242 is coupled with the second fixture body 228. Referring now to FIG. 3, a second pin 262 of the second fixture assembly 242 is received within an opening 130 (shown in FIG. 1) of the second welded block 122 (shown in FIGS. 1 and 4). In an example, the second pin 262 is coupled with the second welded block 122 by an interference fit. The second pin 262 may be coupled to the second welded block 122 using a hammer. When the second pin 262 is coupled with the second welded block 122, a flange portion of the second pin 262 rests on an outer surface of the second welded block 122. The second pin 262 defines a second blind aperture 268.

After coupling the second pin 262 with the second welded block 122, the second fixture assembly 242 is coupled to the second fixture body 228. More particularly, the second fixture assembly 242 includes a second type of bushing 270. The second type of bushing 270 is different from the first type of bushing 254. The second type of bushing 270 is received within the second through-opening 232 of the second fixture body 228. Further, the second type of bushing 270 defines a second through aperture 276. The second through aperture 276 has a larger diameter compared to the first through aperture 258 of the first type of bushing 254. Further, the second type of bushing 270 and the second pin 262 may be made of the same material or different materials. In one example, the second type of bushing 270 and the second pin 262 may be made of an elastic material, without any limitations. The second fixture assembly 242 also includes a rubber bushing 278. The rubber bushing 278 is completely received within the second through aperture 276 of the second type of bushing 270. The rubber bushing 278 defines a third through aperture 280.

A mechanical fastener 282 of the second fixture assembly 242 is received within the third through aperture 280 of the rubber bushing 278. In an example, the mechanical fastener 282 is embodied as a bolt. Further, the second blind aperture 268 of the second pin 262 receives a lower portion of the mechanical fastener 282 to couple the second fixture assembly 242 with the second welded block 122. In an example, the mechanical fastener 282 may be threadably coupled to the rubber bushing 278 and the second pin 262. Alternatively, the mechanical fastener 282 may be coupled to the rubber bushing 278 and the second pin 262 by an interference fit, without any limitations. As shown in FIG. 4, the mechanical fastener 282 is aligned and coupled with each of the rubber bushing 278 and the second pin 262 to couple the second fixture assembly 242 with the second welded block 122.

It should be noted that the first and second fixture assemblies 240, 242 may be interchangeably coupled to any one of the first, second, and third arm members 218, 220, 222, based on a position at which the block 124 (see FIGS. 1 and 5) needs to be coupled. The description provided above teaches coupling of the first fixture assembly 240 with the first fixture body 224 before coupling of the second fixture assembly 242 with the second fixture body 228. However, it should be noted that the present disclosure does not limit a coupling sequence of the first and second fixture assemblies 240, 242 with the respective first and second fixture bodies 224, 228. Thus, the second fixture assembly 242 may be coupled with the second fixture body 228 before the first fixture assembly 240 is coupled with the first fixture body 224, without any limitations.

After the first and second fixture assemblies 240, 242 are coupled with the respective first and second fixture bodies 224, 228, the positioning fixture assembly 244 is coupled with the positioning fixture body 234. Referring now to FIG. 3, a third pin 284 of the positioning fixture assembly 244 is received within an opening 132 (shown in FIG. 1) of the block 124 (shown in FIGS. 1 and 5). In an example, the third pin 284 is coupled with the block 124 by an interference fit. The third pin 284 may be coupled to the block 124 using a hammer. When the third pin 284 is coupled with the block 124, a flange portion of the third pin 284 rests on an outer surface of the block 124. Further, the third pin 284 defines a third blind aperture 290.

After coupling the third pin 284 with the block 124, the positioning fixture assembly 244 is coupled to the positioning fixture body 234. More particularly, the positioning fixture assembly 244 includes a first type of bushing 294. The first type of bushing 294 is received within the third through-opening 238 of the positioning fixture body 234. The first type of bushing 294 is similar to the first type of bushing 254 of the first fixture assembly 440. Further, the first type of bushing 294 defines a fourth through aperture 300. The first type of bushing 294 and the third pin 284 may be made of the same material or different materials. In one example, the first type of bushing 294 and the third pin 284 may be made of an elastic material, without any limitations.

A mechanical fastener 302 of the positioning fixture assembly 244 is received within the fourth through aperture 300 of the first type of bushing 294. In an example, the mechanical fastener 302 is embodied as a bolt. Further, the third blind aperture 290 of the third pin 284 receives a lower portion of the mechanical fastener 302 to couple the positioning fixture assembly 244 with the block 124. In an example, the mechanical fastener 302 may be threadably coupled to the first type of bushing 294 and the third pin 284. Alternatively, the mechanical fastener 302 may be coupled to the first type of bushing 294 and the third pin 284 by an interference fit, without any limitations.

Figure 5:
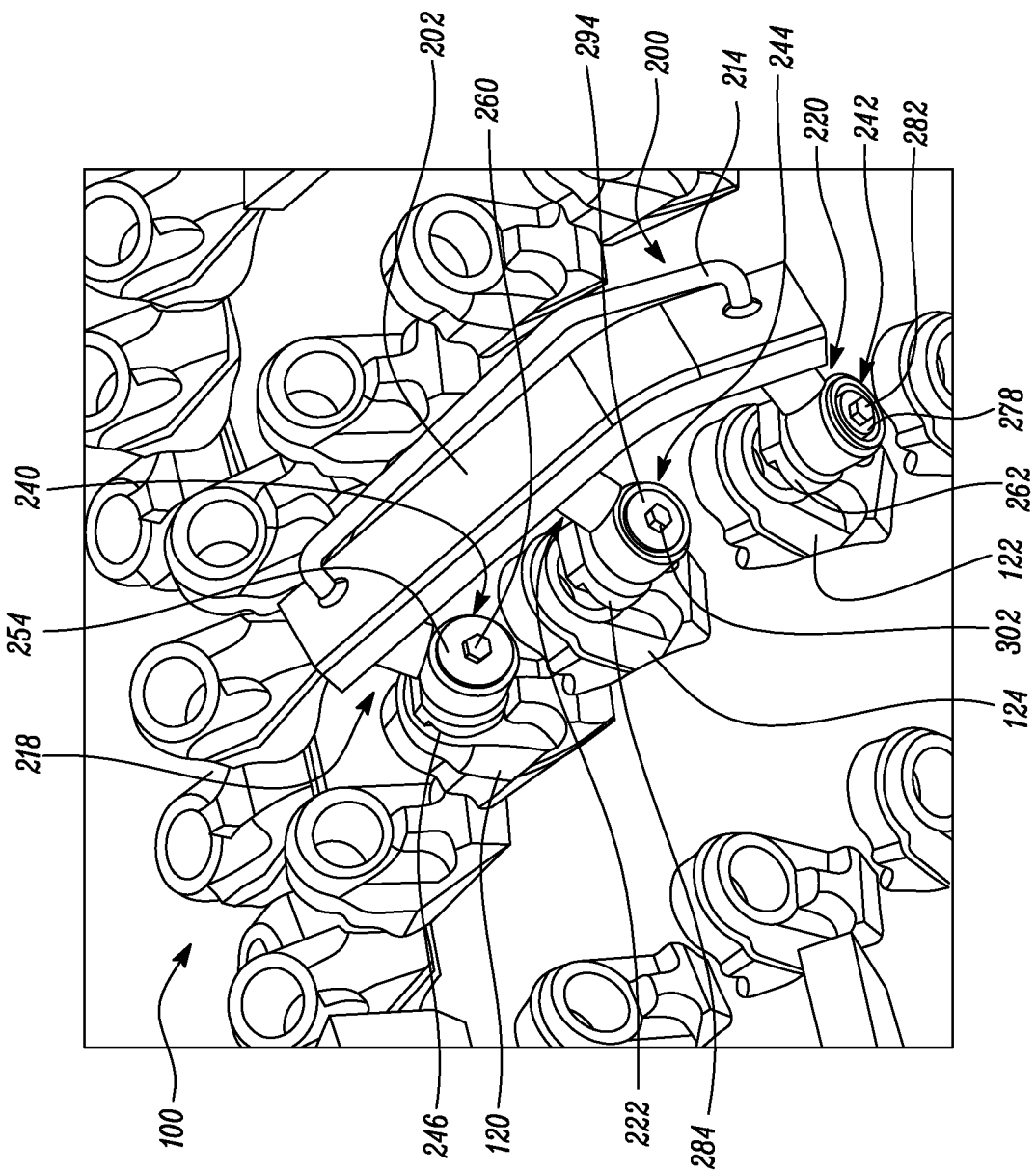
FIG. 5 is a perspective view of the tool and a portion of the milling drum illustrating the block positioned on the milling drum using the tool.

As shown in FIG. 5, the mechanical fastener 302 is aligned and coupled with each of the first type of bushing 294 and the third pin 284 to couple the positioning fixture assembly 244 with the block 124. The coupling of the positioning fixture assembly 244 with the block 124 allows positioning of the block 124 at the desired position 126 (shown in FIG. 1) relative to the first welded block 120 and the second welded block 122. After the block 124 is positioned, the welding operation may be performed to couple the block 124 with the milling drum 100.

It should be noted that the positioning fixture assembly 244 may be interchangeably coupled to any one of the first, second, and third arm members 218, 220, 222, based on the position at which the block 124 needs to be coupled. Further, the longitudinal body 202 and the first, second, and third arm members 218, 220, 222 may be made of a metal. For example, the longitudinal body 202 and the first, second, and third arm members 218, 220, 222 may be made of steel, or any other light weight and sturdy metal that allows the maintenance personnel to hold and position the tool 200 during the welding operation, without any limitations. Further, dimensions of the tool 200 may depend upon a diameter and a pitch of the milling drum 100. Thus, the dimensions of the tool 200 may vary based on application requirements. For example, distances between the first arm member 218 and the third arm member 222 and the second arm member 220 and the third arm member 222 may vary based on the dimensions of the milling drum 100.

Figure 6:
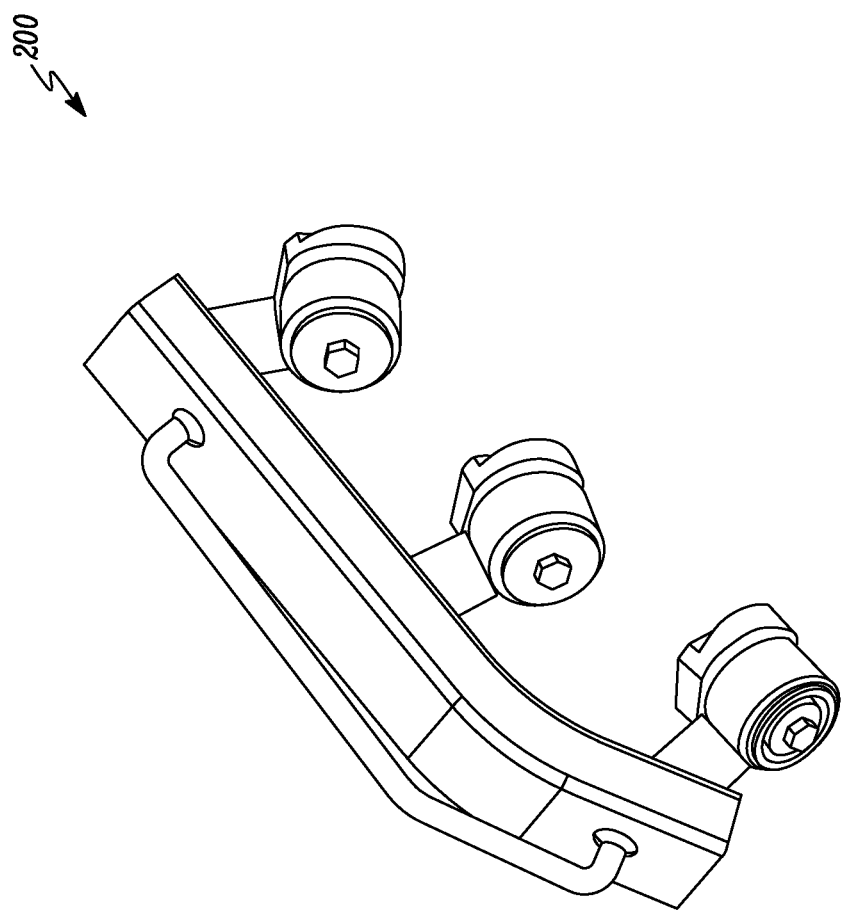
FIG. 6 is a perspective view of a tool for positioning the block on a left hand spiral block arrangement of the milling drum of FIG. 1, according to another embodiment of the present disclosure.

FIG. 6 illustrates the tool 600, according to another embodiment of the present disclosure. The tool 600 is used to position the block 124 on the left hand spiral block arrangement 118 of the milling drum 100. Components, design, and manufacturing of the tool 600 is similar to components, design, and manufacturing of the tool 200. Thus, the description of the tool 200 provided above is equally applicable to the tool 600, without limiting the scope of the present disclosure.

Figure 7:
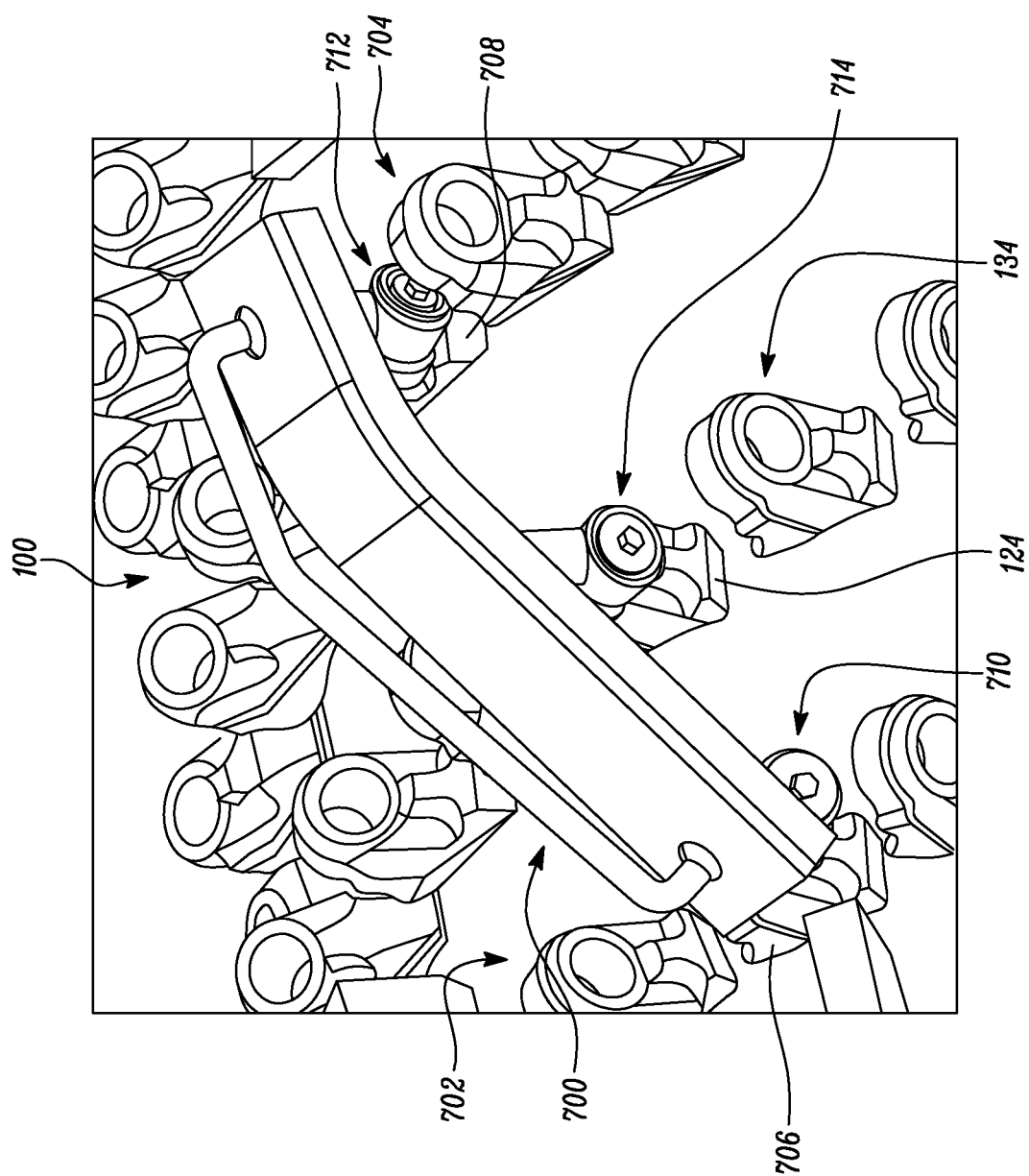
FIG. 7 is a perspective view of another tool used across multiple spirals and a portion of the milling drum illustrating the block positioned on the milling drum using the tool.

FIG. 7 illustrates yet another embodiment of the present disclosure. In this embodiment, the tool 700 is used to position the block 124 at the desired position 126 (see FIG. 1). Components, design, and manufacturing of the tool 700 is similar to components, design, and manufacturing of the tool 200. Thus, the description of the tool 200 provided above is equally applicable to the tool 700, without limiting the scope of the present disclosure.

In the illustrated embodiment, the tool 700 uses a position of a first welded block 706 and a second welded block 708 mounted on corresponding first and second spirals 702, 704 for positioning the block 124 on the spiral 134. The spiral 134 may be located between the first spiral 702 and the second spiral 704. As the first and second welded blocks 706, 708 and the desired position 126 at which the block 124 needs to be positioned are located on different spirals, the tool 700 extends across multiple spirals of the right hand spiral arrangement 114. More particularly, the tool 700 extends across the first spiral 702, the spiral 134, and the second spiral 704. Further, the first fixture assembly 710 is coupled to the first welded block 706 whereas the second fixture assembly 712 is coupled to the second welded block 708. Additionally, the positioning fixture assembly 714 is coupled with the block 124 thereby allowing positioning of the block 124 at the desired position 126.

INDUSTRIAL APPLICABILITY

The present disclosure relates to the tool 200, 600, 700 and a method 800 of positioning the block 124 at any desired position of the milling drum 100. More particularly, the tool 200, 600, 700 ensures accurate placement and positioning of the block 124 by using a position of existing or previously welded blocks. The tool 200, 600, 700 is simple in design, manufacturing, and use. Further, the tool 200, 600, 700 provides a cost-effective solution for positioning the block 124 as requirement of expensive jigs and fixtures for block positioning is eliminated. The tool 200, 600, 700 allows positioning of the block 124 on the worksite in a time efficient manner, thereby reducing additional downtime associated with the machine.

The tool 200, 600, 700 may be used during replacement of one or more blocks 121, 123 on the milling drum 100 as well as during first assembly of the milling drum 100. The tool 200 includes the first type of bushings 254, 294 that are different in configuration from the second type of bushing 270. The use of different bushing configurations compensates for tolerances and accommodates relative position between the welded blocks that are used as reference during positioning of the replacement block 124.

Figure 8:
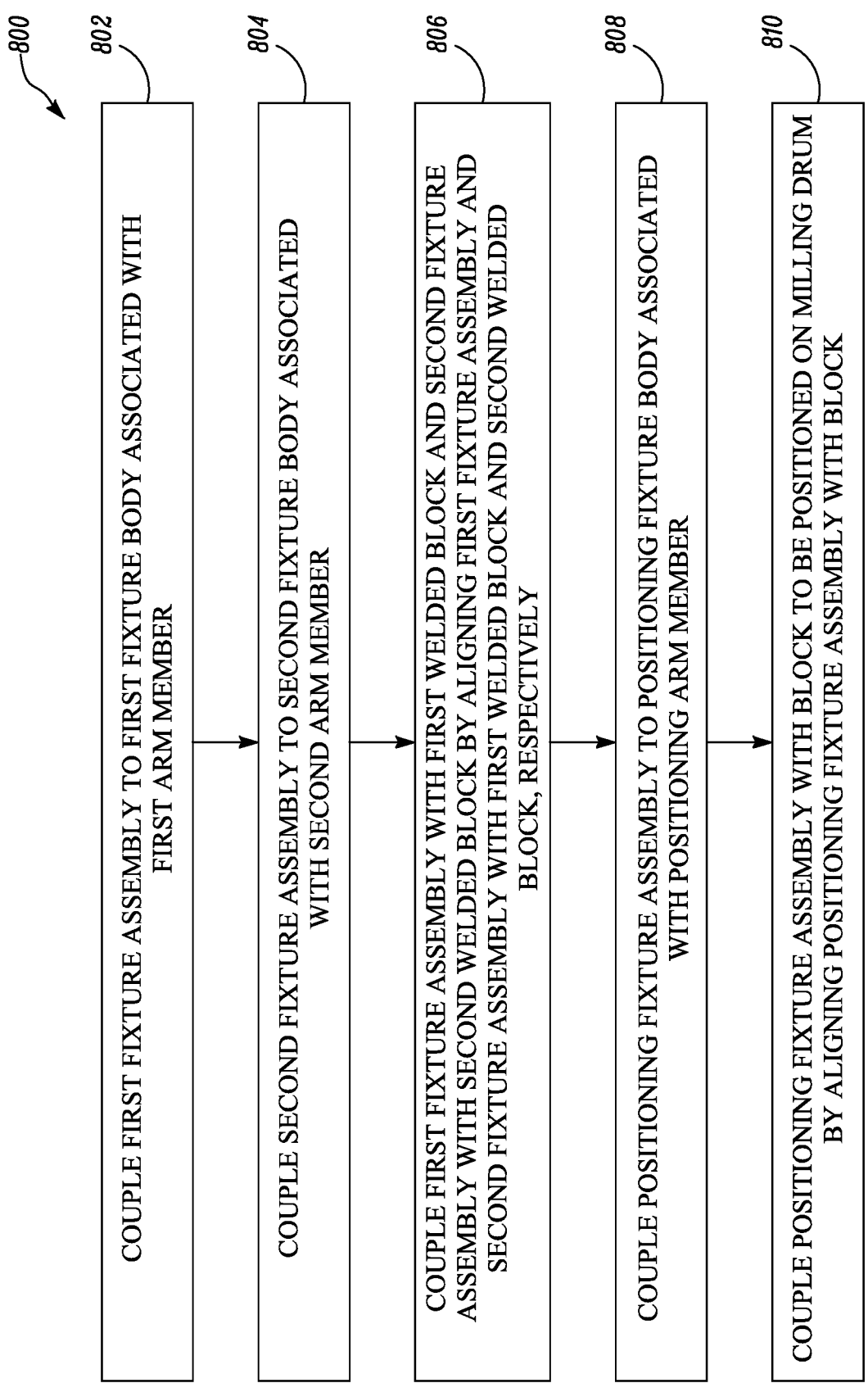
FIG. 8 is a flowchart for a method of positioning the block on the milling drum using the tool.

FIG. 8 is a flowchart for the method 800 for positioning the block 124 on the milling drum 100 using the tool 200, 600, 700. The milling drum 100 includes the first welded block 120, 706 and the second welded block 122, 708 mounted thereon. The tool 200 allows positioning of the block 124 on the right hand spiral block arrangement 114 of the milling drum 100. More particularly, the tool 200 extends along the single spiral 134 and uses the position of the first and second welded blocks 120, 122 on the spiral 134 for positioning the block 124. Additionally, the tool 700 allows positioning of the block 124 with respect to the multiple spirals 702, 134, 704 of the right hand spiral block arrangement 114 of the milling drum 100. More particularly, the tool 700 extends across multiple spirals 702, 134, 704 and uses the position of the first and second welded blocks 706, 708 mounted on the first and second spirals 702, 704, respectively, for positioning the block 124 on the spiral 134. Further, the tool 600 allows positioning of the block 124 on the left hand spiral block arrangement 118 of the milling drum 100. Although the method 800 will now be described in relation to positioning of the block 124 using the tool 200 shown in FIGS. 2 to 5, the method 800 is equally applicable to positioning of the block 124 using the tool 600 shown in FIG. 6 and the tool 700 shown in FIG. 7.

The tool 200 includes the longitudinal body 202, the first arm member 218, the second arm member 220, and the positioning arm member 222. Further, the tool 200 includes the handle 216 that is coupled to the longitudinal body 202 for gripping purposes. At step 802, the first fixture assembly 240 is coupled to the first fixture body 224 associated with the first arm member 218. More particularly, the first type of bushing 254 of the first fixture assembly 240 is received within the first fixture body 224 of the first arm member 218. Further, the mechanical fastener 260 is received within the first type of bushing 254.

At step 804, the second fixture assembly 242 is coupled to the second fixture body 228 associated with the second arm member 220. More particularly, the second type of bushing 270 of the second fixture assembly 242 is received within the second fixture body 228 of the second arm member 220. Additionally, the rubber bushing 278 is aligned and received within the second type of bushing 270. Further, the mechanical fastener 282 is received within the second type of bushing 270.

At step, 806, the first fixture assembly 240 is coupled with the first welded block 120 and the second fixture assembly 242 is coupled with the second welded block 122 by aligning the first fixture assembly 240 and the second fixture assembly 242 with the first welded block 120 and the second welded block 122, respectively. More particularly, the mechanical fasteners 260, 282 are coupled with the corresponding first and second pins 246, 262 mounted on the first and second welded blocks 120, 122 to couple the first and second fixture assembly 240, 242 with the first welded block 120 and the second welded block 122, respectively At step 808, the positioning fixture assembly 244 is coupled to the positioning fixture body 234 associated with the positioning arm member 222. More particularly, the first type of bushing 294 of the positioning fixture assembly 244 is received within the positioning fixture body 234 of the positioning arm member 222. Further, the mechanical fastener 302 is received within the first type of bushing 294.

At step 810, the positioning fixture assembly 244 is coupled with the block 124 to be positioned on the milling drum 100 by aligning the positioning fixture assembly 244 with the block 124. More particularly, the mechanical fastener 302 is coupled with the third pin 284 mounted on the block 124 to couple the positioning fixture assembly 244 with the block 124. The coupling of the positioning fixture assembly 244 with the block 124 allows positioning of the block 124 at the desired position 126 on the milling drum 100 relative to the first and second welded blocks 120, 122.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

The invention claimed is:

1. A tool for positioning a block on a milling drum having a plurality of welded blocks thereon, the tool comprising:
   a longitudinal body;
   a plurality of arm members extending from the longitudinal body, wherein each of the plurality of arm members includes a fixture body provided at a distal end thereof;
   a plurality of fixture assemblies coupled to the fixture body of the corresponding arm member, the plurality of fixture assemblies being adapted to be coupled with corresponding welded blocks of the plurality of welded blocks,
   wherein at least one of the plurality of arm members and the corresponding fixture assembly coupled to the at least one of the plurality of arm members are adapted to position the block at a desired position on the milling drum relative to the plurality of welded blocks.

2. The tool of claim 1, wherein the tool is adapted for positioning the block on at least one of a left hand spiral block arrangement of the milling drum and a right hand spiral block arrangement of the milling drum.

3. The tool of claim 1, wherein the tool is adapted to extend along at least one of a single spiral and multiple spirals of the milling drum for positioning the block.

4. The tool of claim 1, wherein the at least one of the plurality of arm members includes a positioning arm member having a positioning fixture body provided at a distal end thereof, and wherein at least one of the plurality of fixture assemblies includes a positioning fixture assembly coupled to the positioning fixture body of the positioning arm member, the positioning fixture assembly being adapted to be coupled with the block for positioning the block at the desired position on the milling drum relative to the plurality of welded blocks.

5. The tool of claim 1, wherein the plurality of arm members includes a first arm member and a second arm member, and the plurality of fixture assemblies includes a first fixture assembly and a second fixture assembly.

6. The tool of claim 1, wherein at least one of the plurality of fixture assemblies includes:
   a first type of bushing received within the fixture body of the corresponding arm member; and
   a mechanical fastener received within the first type of bushing, wherein the mechanical fastener is coupled with a pin mounted on the corresponding welded block of the plurality of welded blocks to couple the at least one of the plurality of fixture assemblies with the corresponding welded block.

7. The tool of claim 6, wherein at least one of the plurality of fixture assemblies includes:
   a second type of bushing received within the fixture body of the corresponding arm member, wherein the second type of bushing is different from the first type of bushing;
   a rubber bushing received within the second type of bushing; and
   a mechanical fastener received within the second type of bushing, wherein the mechanical fastener is coupled with a pin mounted on the corresponding welded block of the plurality of welded blocks to couple the at least one of the plurality of fixture assemblies with the corresponding welded block.

8. The tool of claim 6, wherein the positioning fixture assembly includes:
   a first type of bushing received within the positioning fixture body of the positioning arm member; and
   a mechanical fastener received within the first type of bushing, wherein the mechanical fastener is coupled with a pin mounted on the block to be positioned on the milling drum to couple the positioning fixture assembly with the block.

9. The tool of claim 1 further comprising a handle coupled to the longitudinal body.

10. A method of positioning a block on a milling drum using a tool, wherein the milling drum includes a first welded block and a second welded block mounted thereon, and wherein the tool includes a longitudinal body, a first arm member, a second arm member, and a positioning arm member, the method comprising:
   coupling a first fixture assembly to a first fixture body associated with the first arm member;
   coupling a second fixture assembly to a second fixture body associated with the second arm member;
   coupling the first fixture assembly with the first welded block and the second fixture assembly with the second welded block by aligning the first fixture assembly and the second fixture assembly with the first welded block and the second welded block, respectively;
   coupling a positioning fixture assembly to a positioning fixture body associated with the positioning arm member; and
   coupling the positioning fixture assembly with the block to be positioned on the milling drum by aligning the positioning fixture assembly with the block, wherein the coupling of the positioning fixture assembly with the block allows positioning of the block at a desired position on the milling drum relative to the first welded block and the second welded block.

11. The method of claim 10, wherein the tool is adapted for positioning the block on at least one of a left hand spiral block arrangement of the milling drum and a right hand spiral block arrangement of the milling drum.

12. The method of claim 10 further comprising:
   receiving a first type of bushing within at least one of the first fixture body and the second fixture body of the first arm member and the second arm member, respectively;
   receiving a mechanical fastener within the first type of bushing; and
   coupling the mechanical fastener with a pin mounted on at least one of the first welded block and the second welded block to couple the at least one of the first fixture assembly and the second fixture assembly with the first welded block and the second welded block, respectively.

13. The method of claim 12 further comprising:
   receiving a second type of bushing within at least one of the first fixture body and the second fixture body of the first arm member and the second arm member, respectively, wherein the second type of bushing is different from the first type of bushing;
   receiving a rubber bushing within the second type of bushing;
   receiving a mechanical fastener within the second type of bushing; and
   coupling the mechanical fastener with a pin mounted on at least one of the first welded block and the second welded block to couple the at least one of the first fixture assembly and the second fixture assembly with the first welded block and the second welded block, respectively.

14. The method of claim 12 further comprising:
   receiving a first type of bushing within the positioning fixture body of the positioning arm member;
   receiving a mechanical fastener within the first type of bushing; and
   coupling the mechanical fastener with a pin mounted on the block to be positioned on the milling drum to couple the positioning fixture assembly with the block.

15. The method of claim 12, wherein the tool includes a handle coupled to the longitudinal body.

16. A tool for positioning a block on a milling drum having a first welded block and a second welded block thereon, the tool comprising:
   a longitudinal body;
   a handle coupled to the longitudinal body;
   a first arm member extending from the longitudinal body, wherein the first arm member includes a first fixture body provided at a distal end thereof;
   a first fixture assembly adapted to be coupled with the first fixture body of the first arm member, wherein the first fixture assembly is further adapted to be coupled with the first welded block;
   a second arm member extending from the longitudinal body, wherein the second arm member includes a second fixture body provided at a distal end thereof;
   a second fixture assembly adapted to be coupled with the second fixture body of the second arm member, wherein the second fixture assembly is further adapted to be coupled with the second welded block;
   a positioning arm member extending from the longitudinal body, wherein the positioning arm member includes a positioning fixture body provided at a distal end thereof; and
   a positioning fixture assembly adapted to be coupled with the positioning fixture body of the positioning arm member, wherein the positioning fixture assembly is further adapted to be coupled with the block to be positioned on the milling drum for positioning the block at a desired position on the milling drum relative to the first welded block and the second welded block.

17. The tool of claim 16, wherein the tool is adapted for positioning the block on at least one of a left hand spiral block arrangement of the milling drum and a right hand spiral block arrangement of the milling drum.

18. The tool of claim 16, wherein at least one of the first fixture assembly and the second fixture assembly includes:
   a first type of bushing received within at least one of the first fixture body and the second fixture body of the first arm member and the second arm member, respectively; and
   a mechanical fastener received within the first type of bushing, wherein the mechanical fastener is coupled with a pin mounted on at least one of the first welded block and the second welded block to couple the at least one of the first fixture assembly and the second fixture assembly with the first welded block and the second welded block, respectively.

19. The tool of claim 18, wherein at least one of the first fixture assembly and the second fixture assembly includes:
   a second type of bushing received within at least one of the first fixture body and the second fixture body of the first arm member and the second arm member, respectively, wherein the second type of bushing is different from the first type of bushing;

a rubber bushing received within the second type of bushing; and a mechanical fastener received within the rubber bushing, wherein the mechanical fastener is coupled with a pin mounted on at least one of the first welded block and the second welded block to couple the at least one of the first fixture assembly and the second fixture assembly with the first welded block and the second welded block, respectively.

20. The tool of claim 18, wherein the positioning fixture assembly includes:

a first type of bushing received within positioning fixture body of the positioning arm member, respectively; and a mechanical fastener received within the first type of bushing, wherein the mechanical fastener is coupled with a pin mounted on the block to be positioned on the milling drum to couple the positioning fixture assembly with the block.

\* \* \* \* \*